(12) United States Patent
Di Schino et al.

(10) Patent No.: US 11,994,238 B2
(45) Date of Patent: May 28, 2024

(54) PIPELAYER MACHINE WITH OPERATOR CABIN HAVING NARROW FRONT VIEW

(71) Applicant: Caterpillar Inc., Peoria, IL (US)

(72) Inventors: Marc Di Schino, Sinard (FR); Mihai Lazaroiu, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 304 days.

(21) Appl. No.: 17/449,894

(22) Filed: Oct. 4, 2021

(65) Prior Publication Data

US 2023/0103755 A1   Apr. 6, 2023

(51) Int. Cl.
| | | |
|---|---|---|
| *B66C 13/54* | (2006.01) | |
| *B66C 23/06* | (2006.01) | |
| *B66C 23/46* | (2006.01) | |
| *B66C 23/76* | (2006.01) | |
| *E02F 9/16* | (2006.01) | |
| *F16L 1/024* | (2006.01) | |

(52) U.S. Cl.
CPC .............. *F16L 1/024* (2013.01); *B66C 13/54* (2013.01); *B66C 23/06* (2013.01); *B66C 23/46* (2013.01); *B66C 23/76* (2013.01); *E02F 9/16* (2013.01); *B66C 2700/0378* (2013.01); *B66C 2700/0392* (2013.01)

(58) Field of Classification Search
CPC . E02F 9/16; E02F 9/163; B62D 33/06; B66C 13/54; F16L 1/024
See application file for complete search history.

(56) References Cited

U.S. PATENT DOCUMENTS

| D248,475 S | * | 7/1978 | Parks | ............................. D15/30 |
| 5,413,188 A | * | 5/1995 | Ui | .......................... B60J 5/0487 |
| | | | | 296/190.08 |
| 6,065,799 A | * | 5/2000 | Suwabe | ............. B62D 33/0636 |
| | | | | 180/89.18 |
| 7,243,982 B2 | | 7/2007 | Kelley et al. | |
| 7,845,503 B2 | * | 12/2010 | Laurini | ................... B66C 23/76 |
| | | | | 212/197 |
| 8,152,412 B2 | | 4/2012 | Davis | |
| 8,851,555 B2 | * | 10/2014 | Gielda | ..................... E02F 9/163 |
| | | | | 280/756 |

(Continued)

FOREIGN PATENT DOCUMENTS

| CA | 3048555 A1 | 1/2019 |
| JP | 5978438 B2 | 8/2016 |

*Primary Examiner* — Frederick L Lagman
(74) *Attorney, Agent, or Firm* — Harrity & Harrity, LLP

(57) ABSTRACT

An operator cabin may include a frame; a seat assembly supported by the frame; and one or more operator controls to control one or more components of a pipelayer machine, the operator controls being supported by the frame. The frame includes a front surface; a rear surface opposite the front surface; a first lateral surface; and a second lateral surface opposite the first lateral surface. The front surface may comprise a first front support structure and a second front support structure opposite the first front support structure. The rear surface may comprise a first rear support structure and a second rear support structure opposite the first rear support structure. A first distance between the first rear support structure and the second rear support structure may exceed a second distance between the first front support structure and the second front support structure.

20 Claims, 7 Drawing Sheets

(56) References Cited

U.S. PATENT DOCUMENTS

| | | | |
|---|---|---|---|
| 8,870,256 B2* | 10/2014 | Kamimae | E02F 9/163 |
| | | | 296/24.44 |
| 8,926,003 B2* | 1/2015 | Gielda | B60R 21/13 |
| | | | 280/756 |
| 8,998,303 B2* | 4/2015 | Gielda | B62D 33/0617 |
| | | | 280/756 |
| 9,296,595 B2* | 3/2016 | Downing | B66C 13/54 |
| 9,399,854 B2 | 7/2016 | Kitashou et al. | |
| 10,041,226 B2* | 8/2018 | Hart | E02F 3/7645 |
| 10,767,821 B2 | 9/2020 | Fretz et al. | |
| 10,773,931 B2* | 9/2020 | Pletz | B66C 1/442 |
| 11,358,839 B2* | 6/2022 | Pletz | B66C 25/00 |
| 2013/0026431 A1* | 1/2013 | Uemura | F16L 1/028 |
| | | | 254/325 |
| 2016/0169413 A1* | 6/2016 | Camacho | F16L 1/06 |
| | | | 414/745.6 |
| 2016/0207744 A1* | 7/2016 | Uemura | F16L 1/065 |
| 2019/0337776 A1* | 11/2019 | Fanello | B66C 15/065 |

* cited by examiner

PIPELAYER MACHINE WITH OPERATOR CABIN HAVING NARROW FRONT VIEW

TECHNICAL FIELD

The present disclosure relates generally to a pipelayer machine and, for example, to a pipelayer machine with an operator cabin having a narrow front view.

BACKGROUND

A pipelayer is a machine that is used for installing large, heavy pipeline segments into and/or above ground. The pipelayer machine includes an operator cabin with a front surface. The front surface may include front support structures. Currently, locations of the front support structures obstruct a view to cables that are used during a lifting operation, thereby reducing a visibility of an operator to the cables during the lifting operation. The cables may be provided on a left side and/or a right side of the pipelayer.

Performing the lifting operation under reduced visibility may cause the operator to frequently stop the pipelayer to ensure that the cables are not damaged, that the cables are not experiencing a jam, and/or that the cable are operating properly, among other examples. Accordingly, the reduced visibility may decrease a measure of efficiency of operating the pipelayer.

U.S. Pat. No. 9,399,854 (the '854 patent) discloses that a work vehicle cab includes a floor, a ceiling, a left supporting member, a right supporting member, a front panel, a front panel reinforcement member, a front-left pillar, and a front-right pillar. The '854 patent further discloses that the front panel is arranged between the left supporting member and the right supporting member. The '854 patent also discloses that the front-left window 39 and the front-right window 42 are arranged such that the width between the front-left window 39 and the front-right window 42 narrow towards the front.

While the '854 patent discloses that the front-left window 39 and the front-right window 42 are arranged such that the width between the front-left window 39 and the front-right window 42 narrow towards the front, the '854 patent specifically discloses a motor grader. Therefore, the '854 patent does not address any visibility issues associated with a pipelayer, as discussed above.

The pipelayer machine of the present disclosure solves one or more of the problems set forth above and/or other problems in the art.

SUMMARY

In some implementations, an operator cabin includes a frame; a seat assembly supported by the frame; one or more operator controls to control one or more components of a pipelayer machine, the operator controls being supported by the frame. The frame includes a front surface; a rear surface opposite the front surface; a first lateral surface; and a second lateral surface opposite the first lateral surface, wherein the front surface comprises a first front support structure and a second front support structure opposite the first front support structure, wherein the rear surface comprises a first rear support structure and a second rear support structure opposite the first rear support structure, and wherein a first distance between the first rear support structure and the second rear support structure exceeds a second distance between the first front support structure and the second front support structure.

In some implementations, a machine includes a machine chassis; a boom coupled to the machine chassis, a hook component connected to the boom; and an operator cabin supported by the machine chassis, wherein the operator cabin comprises a front surface, a rear surface, and one or more operator controls to control the boom and the hook component, and wherein a first width of the rear surface exceeds a second width of the front surface.

In some implementations, an operator cabin includes a frame; one or more operator controls to control one or more components of a machine, the operator controls being supported by the frame; and a seat assembly, the frame including a front surface, a rear surface opposite the front surface, a first lateral surface, and a second lateral surface opposite the first lateral surface, wherein the one or more components include a boom and a hook component connected to the boom, wherein a first width of the rear surface exceeds a second width of the front surface, and wherein the seat assembly is configured to face a front portion of the machine.

DETAILED DESCRIPTION

The present disclosure is directed to increasing a visibility of an operator of a pipelayer machine with respect to a work area surrounding the pipelayer machine. For example, the present disclosure is directed to increasing a visibility (of the operator) to cables of a winch tower (provided on a right side of the pipelayer machine) and to cables of a fairlead tower (provided on a left side of the pipelayer machine). For instance, front support structures, of a front surface of an operator cabin, may be moved closer to a widthwise central axis of the operator cabin.

By moving the front support structures in this manner, a visibility of the operator to the cables (of the winch tower and of the fairlead tower) may be increased in comparison to a visibility of operators to similar cables of existing pipelayer machines. Increasing the visibility of the operator may increase a measure of efficiency of operating the pipelayer during lifting operation. As a result of moving the front support structures, a width of a rear surface of the operator cabin may exceed a width of the front surface of the operator cabin.

The term "machine" may refer to a device that performs an operation associated with an industry such as, for example, mining, construction, farming, transportation, or another type of industry. Moreover, one or more implements may be connected to the machine. The term "visibility" may refer to a visibility of the operator, in the operator cabin, to areas surrounding the machine and to any surface external with respect to internal surfaces of the operator cabin. The visibility of the operator may be a visibility of an average sized operator and/or a visibility of approximately $20^{th}$ to $80^{th}$ percentile of an operator size.

Figure 1:
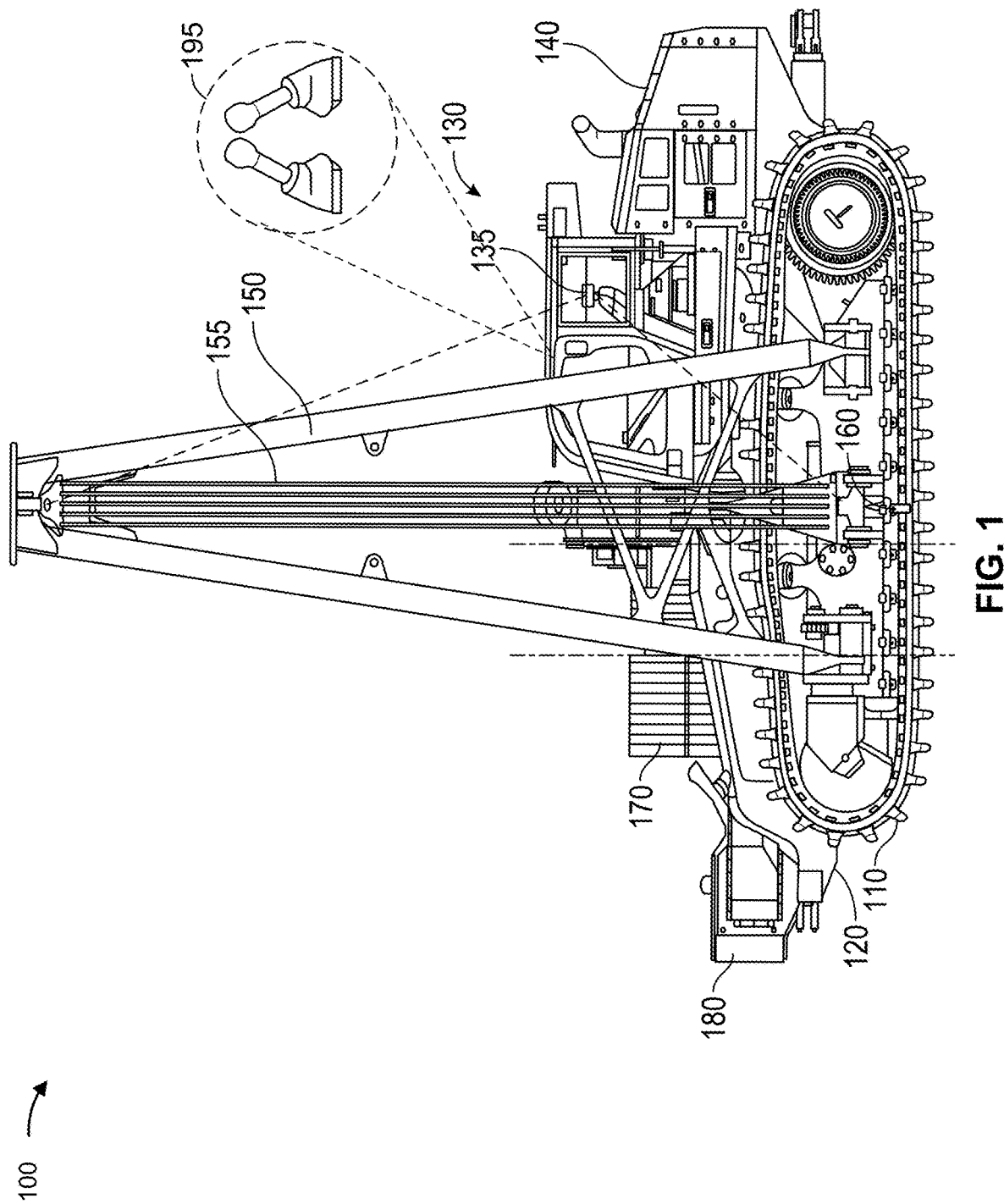
FIG. 1 is a diagram of a side view of an example machine described herein.

FIG. 1 is a diagram of a side view of an example machine 100 described herein. As shown in FIG. 1, machine 100 is embodied as a pipelayer machine. While FIG. 1 illustrates a pipelayer machine, the present disclosure may be applicable to another type of machine with a lifting assembly.

As shown in FIG. 1, machine 100 includes ground engaging members 110, a machine chassis 120, an operator cabin 130, a power source 140, a boom 150, a hook component 160, a counterweight assembly 170, and a towing winch assembly 180. As shown in FIG. 1, ground engaging members 110 include tracks that are composed of a series of interlinked track shoes in an oval track and/or high drive configuration. Alternatively, ground engaging members 110 may include wheels, rollers, among other examples.

As shown in FIG. 1, machine chassis 120 may be provided between ground engaging members 110 (between referring to the widthwise direction of machine 100 relative to forward and backward travel). In some implementations, machine 100 may be configured such that a location of a center of gravity of machine 100 is lower than a location of a center of gravity of existing pipelayer machines. Machine chassis 120 may be configured to support operator cabin 130 and power source 140. Operator cabin 130 may include an integrated display (not shown) and operator controls 195, such as, for example, integrated joysticks. Operator controls 195 may include one or more input components to generate signals to control movement of machine 100 (e.g., to control a movement of ground engaging members 110, boom 150, hook component 160, among other components of machine 100). For example, operator controls 195 may be configured to control machine 100 during an operation that involves a fairlead tower (shown in FIG. 2) of machine 100 and a winch tower (shown in FIG. 2) of machine 100.

Operator cabin 130 may further include seat assembly 135. Seat assembly 135 may be configured to face a front portion of machine 100. Operator cabin 130 may be configured to be stationary with respect to machine chassis 120 and ground engaging members 110. As shown in FIG. 1, operator cabin 130 may be provided between power source 140 and towing winch assembly 180.

Power source 140 may include an engine. As an example, power source 140 may include an internal combustion engine. As shown in FIG. 1, power source 140 may be provided in a rear portion of machine 100. For example, power source 140 may be provided adjacent to a rear surface (not shown) of operator cabin 130. By providing power source 140 in the rear portion of machine 100, a visibility (of the operator of machine 100) to side areas and front areas of machine 100 may be increased.

The increased visibility to the side areas and the front areas may decrease a frequency of stopping machine 100 to ensure that no obstructions (e.g., objects, individuals, among other examples) are provided in a path of machine 100 during an operation of machine 100. Accordingly, the increased visibility to the side areas and the front areas may increase a measure of efficiency of operating machine 100.

In some situations, providing power source 140 in the rear portion of machine 100 may increase a lifting capacity of machine 100 with respect to a lifting capacity of existing pipelayer machines. For example, the lifting capacity of machine 100, during lifting operations performed on a declined surface, may be approximately 26% greater than the lifting capacity of existing pipelayer machines during lifting operations performed on the declined surface. As another example, the lifting capacity of machine 100, during lifting operations performed on an inclined surface, may be approximately 30% greater than the lifting capacity of existing pipelayer machines during lifting operations performed on the inclined surface.

Figure 3:
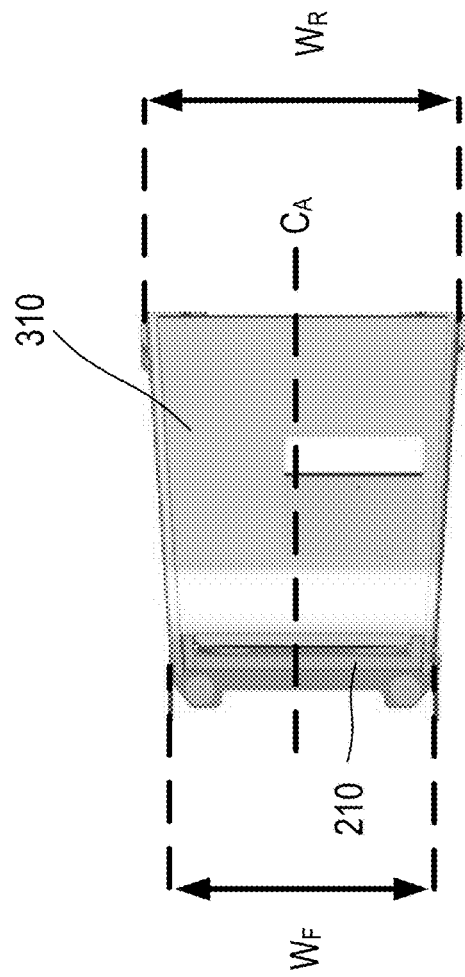
FIG. 3 is a diagram of a top view of an example operator cabin described herein.

Boom 150 may be supported by machine chassis 120. Boom 150 may be configured to extend to a particular height at a particular angle from machine 100 (e.g., during a lifting operation performed by machine 100). As shown in FIG. 1, boom 150 may be provided adjacent to a first lateral surface of operator cabin 130 and forward with respect to seat assembly 135. For example, seat assembly 135 may be provided intersecting a first plane (as shown in FIG. 3) and boom 150 may be provided intersecting a second plane (not shown) that is parallel to the first plane. Boom 150 may be provided, in the second plane, adjacent to the first lateral surface of the operator cabin 130 and forward with respect to seat assembly 135.

By providing boom 150 forward with respect to seat assembly 135, a visibility (of the operator of machine 100) to side areas of machine 100 may be increased. For example, a visibility to hook component 160 and other components associated with boom 150 may be increased. The increased visibility to the side areas (including hook component 160 and the other components associated with boom 150) may increase a measure of efficiency of operating machine 100, as explained above. For example, a measure of efficiency of performing a task using hook component 160 may be increased.

One or more lifting cables 155 may extend from a body of machine 100 to hook component 160 via boom 150 to assist in lifting and/or placing a load. Hook component 160 may include a cradle and/or other mechanism for securing, carrying, holding, lifting, and/or placing a pipeline segment. Hook component 160 may be configured to secure or move the load.

Figure 2:
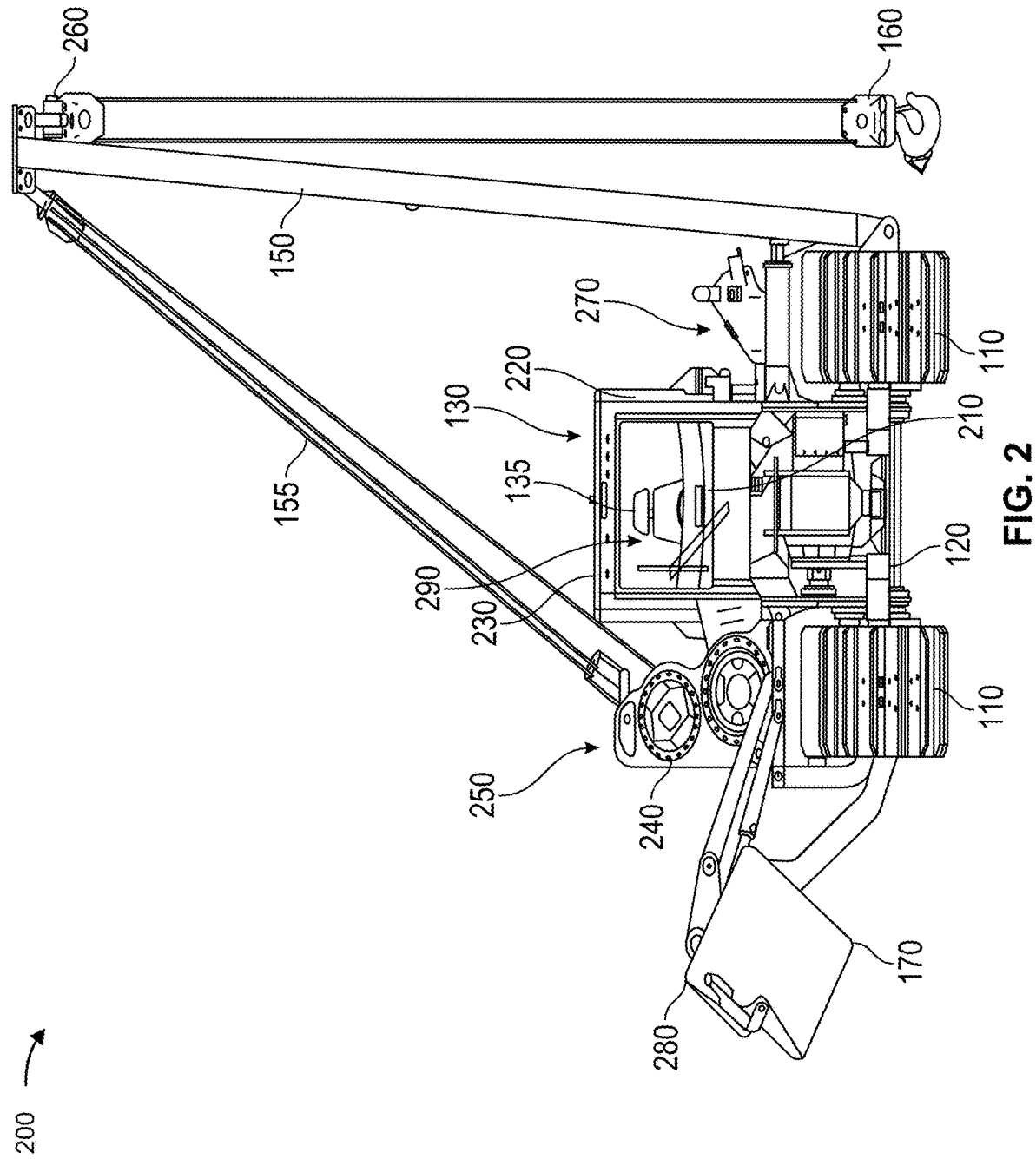
FIG. 2 is a diagram of a front view of an example machine described herein.

Counterweight assembly 170 may be supported by machine chassis 120. Counterweight assembly 170 may be configured to counterbalance forces created as boom 150 is extended during a lifting operation performed by machine 100. For example, counterweight assembly 170 may be configured to extend away from machine chassis 120 during the lifting operation. Counterweight assembly 170 may be provided adjacent to a second lateral surface (as shown in FIG. 2) of operator cabin 130 and forward with respect to seat assembly 135, as explained below.

Towing winch assembly 180 may be coupled to machine chassis 120. Towing winch assembly 180 may be configured to perform lifting and towing operations. Towing winch assembly 180 may include a drum and a cable wound about the drum. As shown in FIG. 1, towing winch assembly 180 may be provided in a front portion of machine 100.

By providing towing winch assembly 180 in the front portion of machine 100 and providing power source 140 in the rear portion of machine 100, a visibility (of the operator of machine 100) to towing winch assembly 180 may be increased. The increased visibility to towing winch assembly 180 may decrease a frequency of stopping machine 100 and a frequency of the operator turning to face the rear portion of machine 100 to ensure that no obstructions (e.g., objects, individuals, among other examples) are within a path of machine 100 during a lifting operation or a towing operating of machine 100. Accordingly, the increased visibility to towing winch assembly 180 may increase a measure of efficiency of operating machine 100 during lifting operations and towing operations that involve towing winch assembly 180. Additionally, the weight of towing winch assembly 180 helps to counterbalance the weight of power source 140, improving the overall balance of the machine 100.

As indicated above, FIG. 1 is provided as an example. Other examples may differ from what was described in connection with FIG. 1. The number and arrangement of components shown in FIG. 1 are provided as an example. In practice, there may be additional components, fewer components, different components, or differently arranged components than those shown in FIG. 1.

FIG. 2 is a diagram of a front view of machine 100. Some elements of machine 100 have been described above in connection with FIG. 1. As shown in FIG. 2, operator cabin 130 may include a front surface 210, a first lateral surface 220, and a second lateral surface 230 opposite the first lateral surface 220.

As shown in FIG. 2, machine 100 may include a winch 240, a winch tower 250, a pulley 260, and a fairlead tower 270. Winch 240, winch tower 250, pulley 260, and/or fairlead tower 270 may be associated with boom 150 and hook component 160. In some examples, winch 240, winch tower 250, pulley 260, and/or fairlead tower 270 may be used during a lifting operation that involves boom 150 and hook component 160. For example, one or more lifting cables 155 may extend from winch 240 through pulley 260 to hook component 160 via boom 150 in order to assist in lifting, securing, and/or placing a load. As shown in FIG. 2, winch tower 250 may be provided adjacent to counterweight assembly 170 and fairlead tower 270 may be provided adjacent to boom 150. Winch tower 250 may include one or more cables that are used during a lifting operation performed by machine 100. The one or more cables may include a portion of the one or more lifting cables 155 that connect hook component 160 to boom 150. Fairlead tower 270 may include one or more cables that are used during a lifting operation performed by machine 100. The one or more cables may include a portion of the one or more lifting cables 155 that connect hook component 160 to boom 150.

As shown in FIG. 2, boom 150, hook component 160, and fairlead tower 270 may be provided adjacent to first lateral surface 220 while counterweight assembly 170 and winch tower 250 may be provided adjacent to second lateral surface 230. In some implementations, boom 150, hook component 160, and fairlead tower 270 may be provided adjacent to second lateral surface 230 while counterweight assembly 170 and winch tower 250 may be provided adjacent to first lateral surface 220.

As explained above in connection with FIG. 1, counterweight assembly 170 may be configured to extend away from machine chassis 120. As shown in FIG. 2, when counterweight assembly 170 is extended away from machine chassis 120, a top surface 280 of counterweight assembly 170 may be disposed below a top portion 290 of seat assembly 135. By disposing the top surface 280 of counterweight assembly 170 below the top portion 290 of seat assembly 135, a visibility (of the operator of machine 100) to side surfaces (e.g., adjacent to counterweight assembly 170) may be increased. Accordingly, the increased visibility to the side surfaces may increase a measure of efficiency of operating machine 100 during lifting operations and towing operations associated with extending counterweight assembly 170.

As indicated above, FIG. 2 is provided as an example. Other examples may differ from what was described in connection with FIG. 2. The number and arrangement of components shown in FIG. 2 are provided as an example. In practice, there may be additional components, fewer components, different components, or differently arranged components than those shown in FIG. 2.

FIG. 3 is a diagram of a top view of operator cabin 130. Some elements of operator cabin 130 have been described above in connection with FIG. 1 and FIG. 2. As shown in FIG. 3, operator cabin 130 may include a top surface 310 and may have a center axis $C_A$. Front support structures, of front surface 210, may be provided closer to center axis $C_A$ than rear support structures, of a rear surface of operator cabin 130, to center axis $C_A$ (and closer than corresponding front support structures, of operator cabins of existing pipelayer machines, to a center axis of the operator cabins). Further, the operator cabin 130 can include a frame (not shown), which supports various structure of the operator cabin such as an operator seat assembly and operator controls 195. As used herein, the term "support" means one structure is attached to another structure, whether directly or indirectly.

By providing the front support structures closer to center axis $C_A$, the front support structures may not obstruct a view of the operator to winch tower 250 and to the cables of winch tower 250. Accordingly, a visibility of the operator to winch tower 250 and to the cables of winch tower 250 may be increased in comparison to a visibility of operators to similar cables of existing pipelayer machines. Therefore, a measure of efficiency of operating boom 150 and hook component 160 may be increased, in manner similar to the manner described above.

Additionally, by providing the front support structures closer to center axis $C_A$, the front support structures may not obstruct a view of the operator (of machine 100) to fairlead tower 270 and to the cables of fairlead tower 270. Accordingly, a visibility of the operator to fairlead tower 270 and to the cables of fairlead tower 270 may be increased in comparison to a visibility of operators to similar cables of existing pipelayer machines. Therefore, a measure of efficiency of operating boom 150 and hook component 160 may be increased, in manner similar to the manner described above.

By providing the front support structures closer to center axis $C_A$ than the rear support structures to center axis $C_A$, a width $W_R$ of the rear surface may exceed a width $W_F$ of the front surface, as shown in FIG. 3. In some situations, winch tower 250 may be provided forward with respect to seat assembly 135. Accordingly, a visibility (of the operator) to winch tower 250 and side areas adjacent to winch tower 250 may be increased. In some situations, fairlead tower 270 and hook component 160 may be provided forward with respect to seat assembly 135. Accordingly, a visibility (of the operator) to fairlead tower 270, hook component 160, and side areas adjacent to boom 150 may be increased.

As indicated above, FIG. 3 is provided as an example. Other examples may differ from what was described in connection with FIG. 3. The number and arrangement of components shown in FIG. 3 are provided as an example. In practice, there may be additional components, fewer components, different components, or differently arranged components than those shown in FIG. 3.

Figure 4:
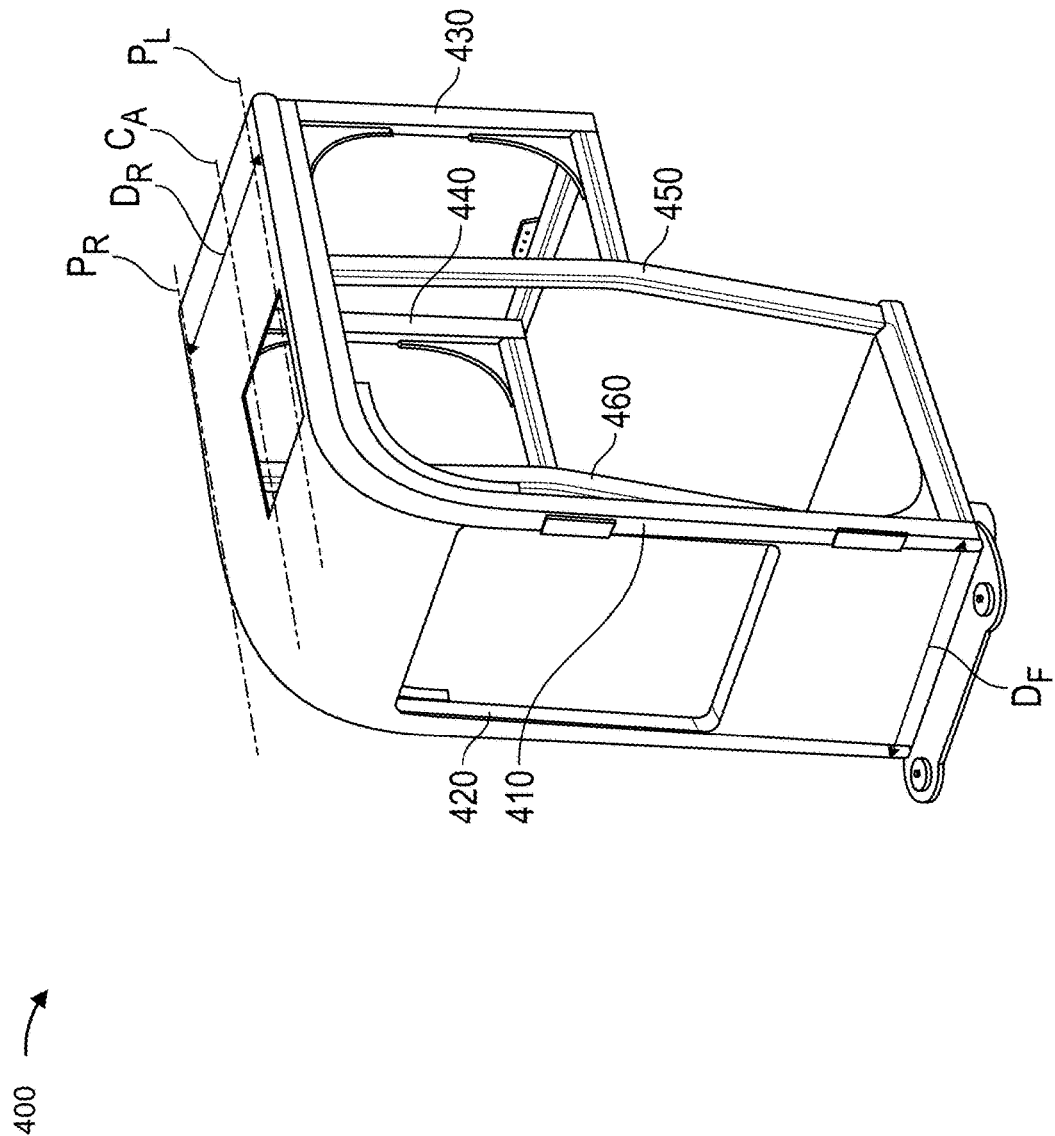
FIG. 4 is a diagram of a perspective view of a frame of an example operator cabin described herein.

FIG. 4 is a diagram of a perspective view of a frame of operator cabin 130. As shown in FIG. 4, front surface 210 (of operator cabin 130) comprises a first front support structure 410 and a second front support structure 420 opposite first front support structure 410. The rear surface (of operator cabin 130) comprises a first rear support structure 430 and a second rear support structure 440 opposite the first rear support structure 430.

As explained above, first front support structure 410 and second front support structure 420 may be provided closer to center axis $C_A$ than first rear support structure 430 and second rear support structure 440 to center axis $C_A$. Accordingly, as shown in FIG. 4, a first distance $D_R$ between first rear support structure 430 and second rear support structure 440 may exceed a second distance $D_F$ between first front support structure 410 and second front support structure 420. As explained above, locations of first front support structure 410 and second front support structure 420 with respect to center axis $C_A$ increase visibility to winch tower 250 and fairlead tower 270. For example, second distance $D_F$ enables a visibility to fairlead tower 270 via first lateral surface 220 and enables a visibility to winch tower 250 via the second lateral surface 230.

As shown in FIG. 4, first lateral surface 220 may comprise first front support structure 410, first rear support structure 430, and a first middle support structure 450 provided between first front support structure 410 and first rear support structure 430. Second lateral surface 230 may comprise second front support structure 420, second rear support structure 440, and a second middle support structure 460 opposite first middle support structure 450. As shown in FIG. 4, first front support structure 410, first rear support structure 430, and first middle support structure 450 may be provided in a first plane $P_L$. Second front support structure 420, second rear support structure 440, and second middle support structure 460 may be provided in a second plane $P_R$. In some examples, first front support structure 410 and second front support structure 420 may intersect a plane between a plane intersecting fairlead tower 270 (or winch tower 250, or a centerline of boom 150) and a plane intersecting a position where a rearward boom leg of boom 150 meets machine chassis 120 (or mount point).

As indicated above, FIG. 4 is provided as an example. Other examples may differ from what was described in connection with FIG. 4. The number and arrangement of components shown in FIG. 4 are provided as an example. In practice, there may be additional components, fewer components, different components, or differently arranged components than those shown in FIG. 4.

Figure 5:
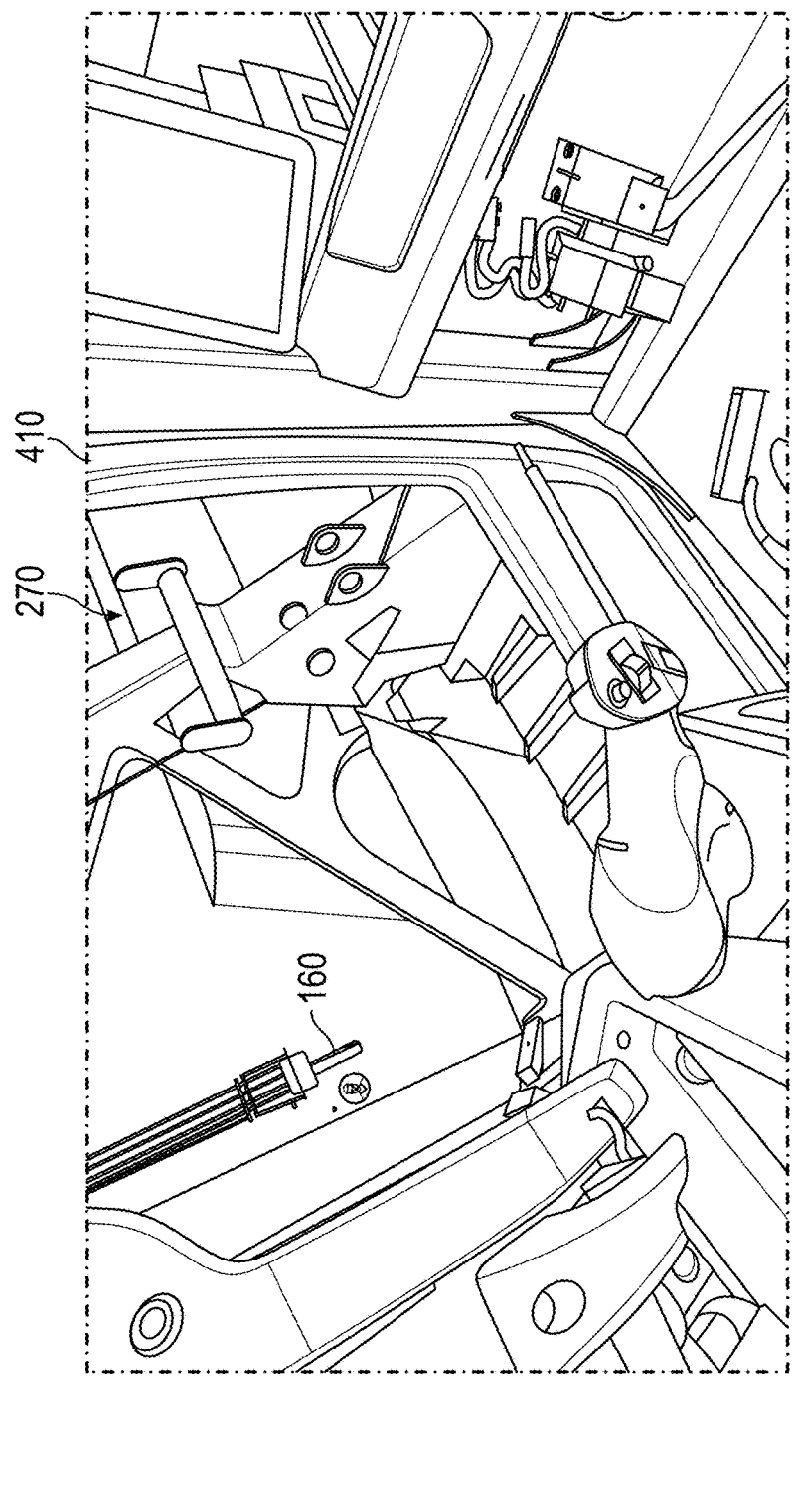
FIG. 5 is a diagram of an inside view of an example operator cabin described herein.

FIG. 5 is a diagram of an inside view of operator cabin 130 described herein. Some elements of machine 100 and operator cabin 130 have been described above in connection with FIGS. 1-4. As shown in FIG. 5, based on a location of first front support structure 410, first lateral surface 220 may be configured to provide visibility to hook component 160 and fairlead tower 270.

As indicated above, FIG. 5 is provided as an example. Other examples may differ from what was described in connection with FIG. 5. The number and arrangement of components shown in FIG. 5 are provided as an example. In practice, there may be additional components, fewer components, different components, or differently arranged components than those shown in FIG. 5.

Figure 6:
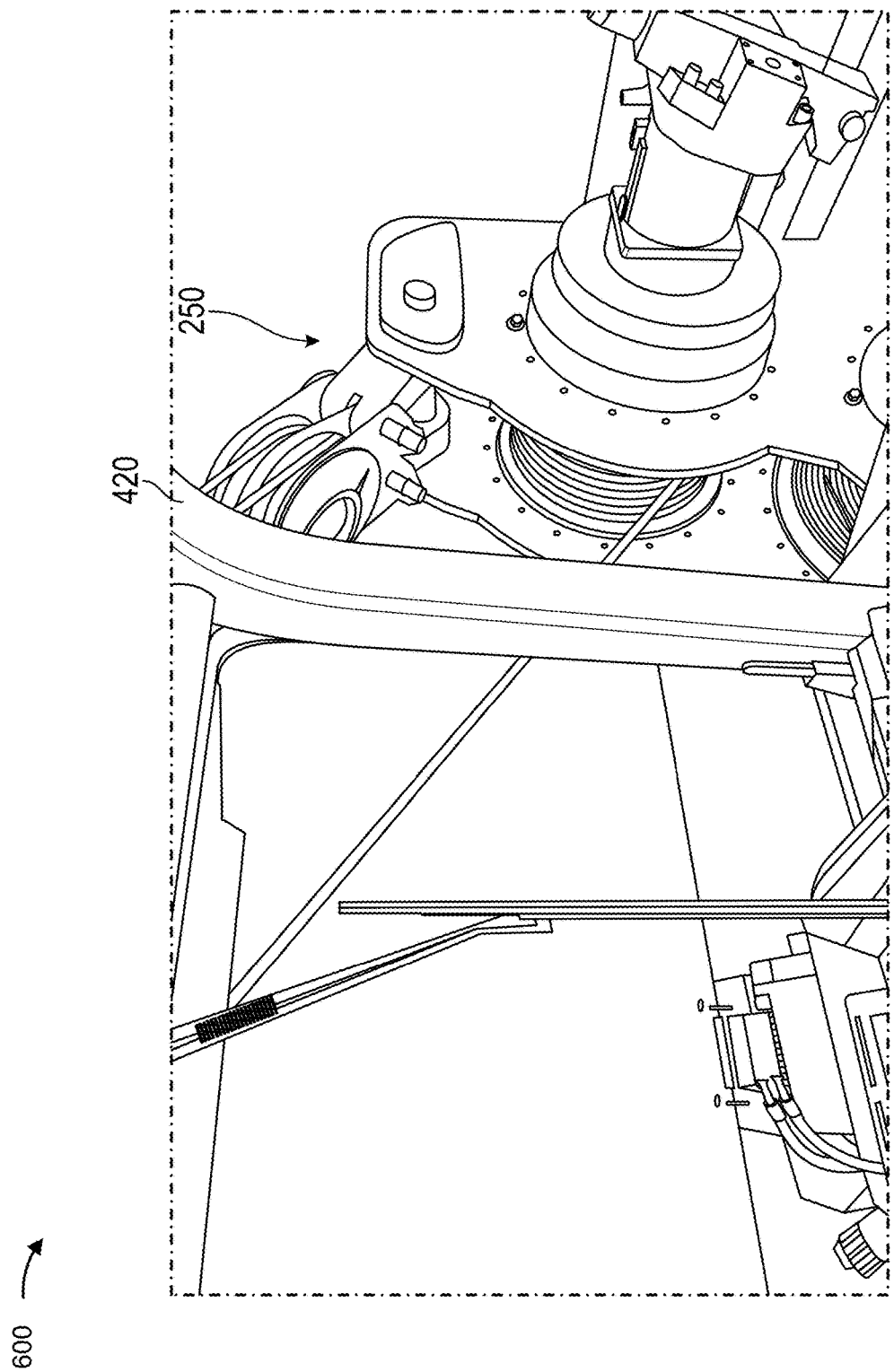
FIG. 6 is a diagram of an inside view of an example operator cabin described herein.

FIG. 6 is a diagram of an inside view of an example operator cabin described herein. Some elements of machine 100 and operator cabin 130 have been described above in connection with FIGS. 1-4. As shown in FIG. 6, based on a location of second front support structure 420, second lateral surface 230 may be configured to provide visibility to winch tower 250.

As indicated above, FIG. 6 is provided as an example. Other examples may differ from what was described in connection with FIG. 6. The number and arrangement of components shown in FIG. 6 are provided as an example. In practice, there may be additional components, fewer components, different components, or differently arranged components than those shown in FIG. 6.

Figure 7:
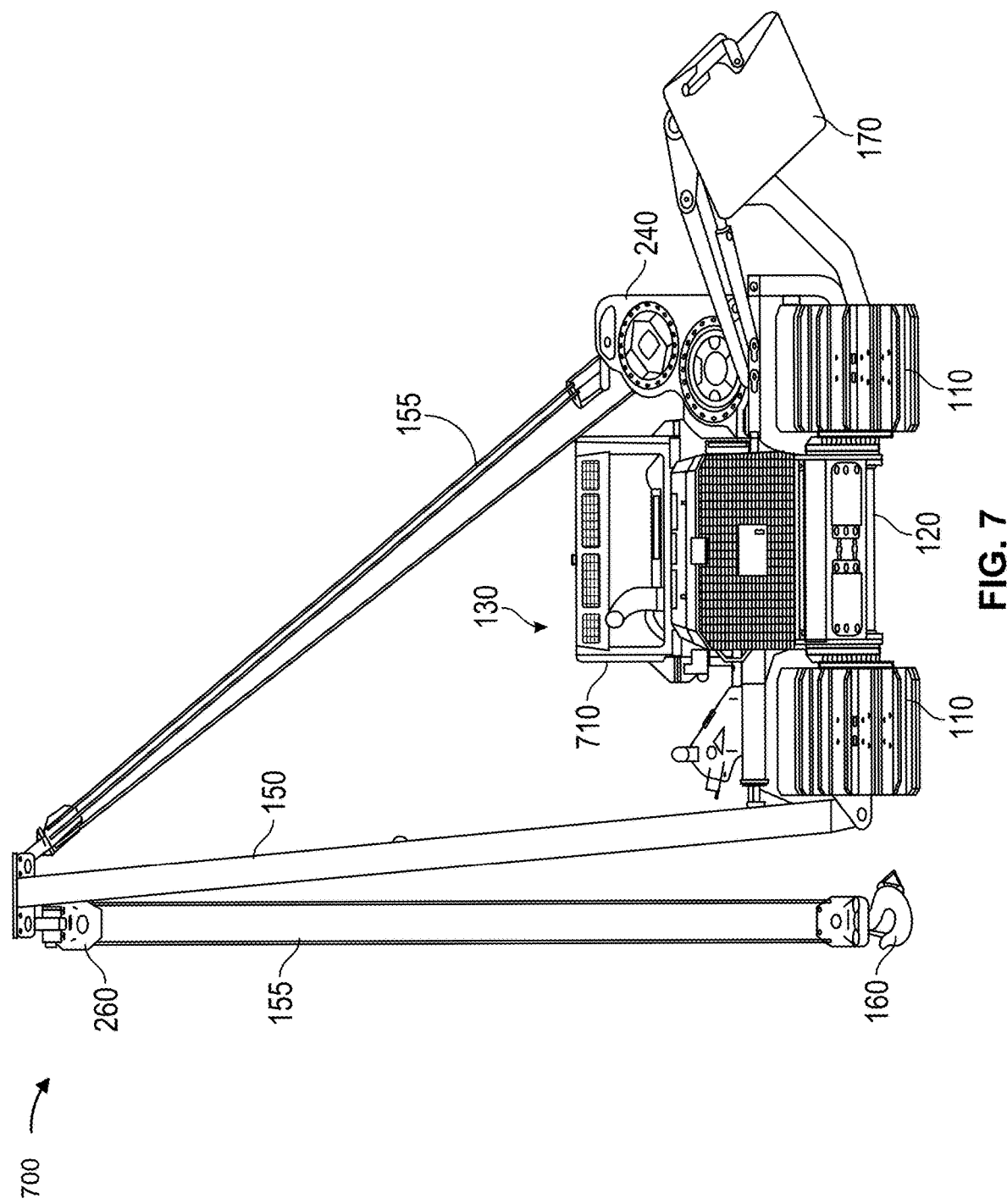
FIG. 7 is a diagram of a rear view of an example machine described herein.

FIG. 7 is a diagram of machine 100 described herein. For example, FIG. 7 is a rear view of machine 100. Some elements of machine 100 have been described above in connection with FIG. 1 and FIG. 2. As shown in FIG. 7, operator cabin 130 includes a rear surface 710.

As indicated above, FIG. 7 is provided as an example. Other examples may differ from what was described in connection with FIG. 7. The number and arrangement of components shown in FIG. 7 are provided as an example. In practice, there may be additional components, fewer components, different components, or differently arranged components than those shown in FIG. 7.

INDUSTRIAL APPLICABILITY

The present disclosure is directed to increasing a visibility of an operator of a pipelayer machine with respect to a work area surrounding the pipelayer machine. For example, the present disclosure is directed to increasing a visibility of the operator to cables of a winch tower (provided on a right side of the pipelayer machine) and cables of a fairlead tower (provided on a left side of the pipelayer machine). For instance, front support structures, of a front surface of an operator cabin, may be moved closer to a central axis of the operator cabin.

For existing pipelayer machines (with stationary operator cabins), locations of the front support structures obstruct a view to cables that are used during a lifting operation, thereby reducing a visibility of an operator to the cables during the lifting operation. The cables may be provided on a left side and/or a right of the pipelayer machine. Performing the lifting operation under reduced visibility may cause the operator to frequently stop the pipelayer machine to ensure that the cables are not damaged, that the cables are not experiencing a jam, that the cables are functioning properly, among other examples. Accordingly, the reduced visibility may decrease a measure of efficiency of operating the pipelayer.

In contrast, by providing the front support structures as explained herein, a visibility of the operator to the cables (of the winch tower and of the fairlead tower) may be increased in comparison to a visibility of operators to similar cables of existing pipelayer machines. Increasing the visibility of the operator may increase a measure of efficiency of operating the pipelayer during lifting operations.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An operator cabin, comprising:
a frame;
a seat assembly supported by the frame; and
one or more operator controls to control one or more components of a pipelayer machine, the operator controls being supported by the frame,
the frame including:
a front surface,
a rear surface opposite the front surface,
a first lateral surface, and
a second lateral surface opposite the first lateral surface,
wherein the front surface comprises a first front support structure and a second front support structure opposite the first front support structure,
wherein the rear surface comprises a first rear support structure and a second rear support structure opposite the first rear support structure,
wherein the first lateral surface defines a first single planar surface between the first front support structure and the first rear support structure,
wherein the second lateral surface defines a second single planar surface between the second front support structure and the second rear support structure, and
wherein a first distance between the first rear support structure and the second rear support structure exceeds a second distance between the first front support structure and the second front support structure.

2. The operator cabin of claim 1, wherein the one or more operator controls are configured to control the pipelayer machine during an operation that involves a fairlead tower of the pipelayer machine, and
wherein the second distance enables a visibility to the fairlead tower via the first lateral surface.

3. The operator cabin of claim 2, wherein the operator cabin is configured to be supported by a machine chassis of the pipelayer machine, and
wherein the seat assembly is configured to face a front portion of the pipelayer machine.

4. The operator cabin of claim 1, wherein the first lateral surface comprises the first front support structure, the first rear support structure, and a first middle support structure provided between the first front support structure and the first rear support structure,
wherein the second lateral surface comprises the second front support structure, the second rear support structure, and a second middle support structure opposite the first middle support structure,
wherein the first front support structure, the first rear support structure, and the first middle support structure are provided in a first plane, and
wherein the second front support structure, the second rear support structure, and the second middle support structure are provided in a second plane.

5. The operator cabin of claim 1, wherein the one or more operator controls are configured to control the pipelayer machine during an operation that involves a winch tower of the pipelayer machine, and
wherein the second distance enables a visibility to the winch tower via the second lateral surface.

6. The operator cabin of claim 1, wherein the one or more components include a boom and a hook component connected to the boom, and
wherein the second distance enables a visibility to the hook component via the second lateral surface.

7. The operator cabin of claim 1, wherein the one or more operator controls are configured to control a counterweight assembly of the pipelayer machine, and
wherein a top portion of the seat assembly is configured to be disposed above a top surface of the counterweight assembly.

8. A machine, comprising:
a machine chassis;
a boom coupled to the machine chassis,
a hook component connected to the boom; and
an operator cabin supported by the machine chassis,
wherein the operator cabin comprises:
a front surface including a first front support structure and a second front support structure,
a rear surface including a first rear support structure and a second rear support structure,
a lateral surface that defines a single planar surface between the first front support structure and the first rear support structure, and
one or more operator controls to control the boom and the hook component, and
wherein a first width of the rear surface exceeds a second width of the front surface.

9. The machine of claim 8, wherein the operator cabin further comprises a seat assembly, and
wherein the seat assembly is configured to face a front portion of the machine.

10. The machine of claim 9, further comprising:
a counterweight assembly provided adjacent to a lateral surface of the operator cabin,
wherein the counterweight assembly is configured to be extended away from the machine chassis, and
wherein, when the counterweight assembly is extended away from the machine chassis, a top surface of the counterweight assembly is disposed below a top portion of the seat assembly.

11. The machine of claim 8, further comprising:
ground engaging members,
wherein the machine chassis is provided between the ground engaging members, and
wherein the operator cabin is stationary with respect to the ground engaging members.

12. The machine of claim 8, further comprising:
a winch tower,
wherein the second width enables the lateral surface, of the operator cabin, to provide visibility to the winch tower.

13. The machine of claim 8,
wherein the lateral surface is a first lateral surface,
wherein the operator cabin further comprises a second lateral surface,
wherein the first lateral surface comprises the first front support structure, the first rear support structure, and a first middle support structure provided between the first front support structure and the first rear support structure,
wherein the second lateral surface comprises the second front support structure, the second rear support structure, and a second middle support structure opposite the first middle support structure,
wherein the first front support structure, the first rear support structure, and the first middle support structure are provided in a first plane, and
wherein the second front support structure, the second rear support structure, and the second middle support structure are provided in a second plane.

14. The machine of claim 8, further comprising:
a fairlead tower,
wherein the second width enables the lateral surface, to provide visibility to the fairlead tower.

15. An operator cabin, comprising:
a frame;
one or more operator controls to control one or more components of a machine, the operator controls being supported by the frame; and
a seat assembly,
the frame including:
a front surface,
a rear surface opposite the front surface,
a first lateral surface comprising a first front support structure, a first rear support structure, and a first middle support structure provided between the first front support structure and the first rear support structure, and
a second lateral surface opposite the first lateral surface and comprising a second front support structure opposite the first front support structure, a second rear support structure opposite the first rear support structure, and a second middle support structure opposite the first middle support structure,
wherein a first distance between the first rear support structure and the second rear support structure exceeds a second distance between the first front support structure and the second front support structure and exceeds a third distance between the first middle support structure and the second middle support structure, and
wherein the seat assembly is configured to face a front portion of the machine.

16. The operator cabin of claim 15,
wherein the first front support structure, the first rear support structure, and the first middle support structure are provided in a first plane, and
wherein the second front support structure, the second rear support structure, and the second middle support structure are provided in a second plane.

17. The operator cabin of claim 15, wherein the second distance enables the first lateral surface to provide visibility to a hook component.

18. The operator cabin of claim 15, wherein the one or more operator controls are configured to control the machine during an operation that involves a winch tower of the machine, and
wherein the second distance enables the first lateral surface to provide visibility to the winch tower.

19. The operator cabin of claim 15, wherein the one or more operator controls are configured to control the machine during an operation that involves a fairlead tower of the machine, and
wherein the second distance enables the first lateral surface to provide visibility to the fairlead tower.

20. The operator cabin of claim 15,
wherein the one or more components include a boom, and
wherein the first front support structure and the second front support structure intersect a plane between:
a plane intersecting a fairlead tower, a winch tower, or a centerline of a boom, and
a plane intersecting a position where a rearward boom leg of the boom meets a machine chassis of the machine.

* * * * *